S. S. SMICK.

Grave-Shield and Body-Protector.

No. 8,941. Reissued Oct. 21, 1879.

WITNESSES

Franck L. Durand

J. J. McCarthy.

By

INVENTOR

S. S. Smick

Alexander Mason

ATTORNEYS

N. PETERS, PHOTO-LITHOGRAPHER, WASHINGTON, D. C.

UNITED STATES PATENT OFFICE.

SOLOMON S. SMICK, OF FORT WAYNE, INDIANA.

IMPROVEMENT IN GRAVE-SHIELD AND BODY-PROTECTOR.

Specification forming part of Letters Patent No. 209,932, dated November 12, 1878; Reissue No. 8,941, dated October 21, 1879; application filed February 10, 1879.

*To all whom it may concern:*

Be it known that I, SOLOMON S. SMICK, of Fort Wayne, in the county of Allen and State of Indiana, have invented certain new and useful Improvements in Grave-Shield and Body-Protector; and I do hereby declare that the following is a full, clear, and exact description thereof, reference being had to the accompanying drawings, and to the letters of reference marked thereon, which form a part of this specification.

The nature of my invention consists in the construction and arrangement of a device which I term a "grave-shield and body-protector," and which has for its object to prevent grave-robbing, and also to beautify and protect the grave as originally rounded up or finished, as will be hereinafter more fully set forth.

In order to enable others skilled in the art to which my invention appertains to make and use the same, I will now proceed to describe its construction and operation, referring to the annexed drawings, in which—

Figure 1:
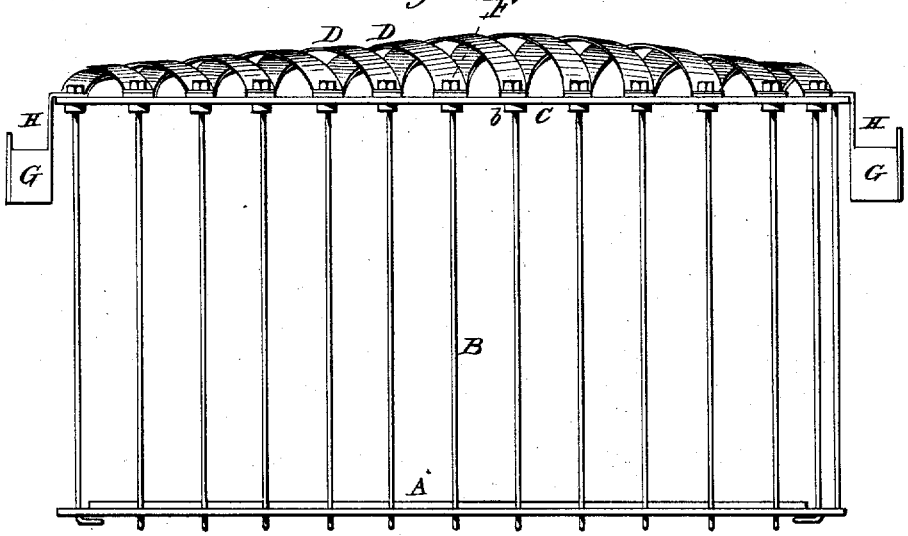
Figure 3:
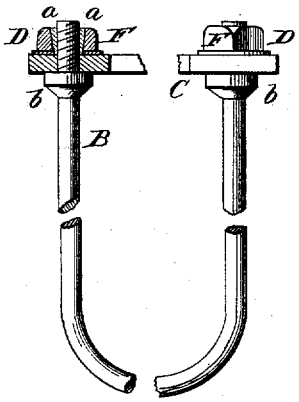
Figure 2:
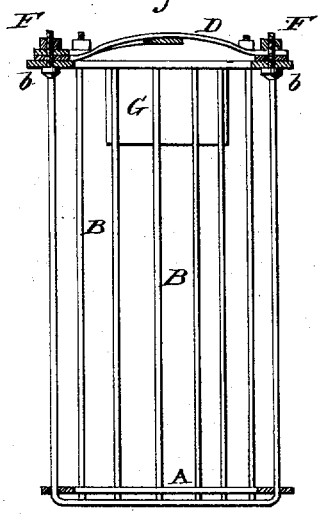

Figure 1 is a side elevation of my invention. Fig. 2 is a transverse vertical section of the same. Fig. 3 is an enlarged sectional view of one of the fastening-bolts.

A represents a bed-plate or frame, of any suitable form and dimensions, under which and up through both of its sides and ends are passed a series of continuous protecting-rods, B B, at suitable distances apart. The center of each rod B passes crosswise under the bed A, and the ends or arms of the rod extend vertically upward through holes in the bed, said bed forming a resting-place for a rough box or coffin.

The protecting-rods B are to extend upward any suitable distance to, or nearly to, the surface of the ground, where they pass through a top or surface plate, C, which plate rests upon shoulders *b b*, formed near the upper ends of the rods B. The top of the cage is thus formed by means of rods or straps D placed on the upper ends of the rods B, and fastened by means of nuts F, screwed down tightly on the upper projecting ends of the rods B.

At each end, however, is first attached a box or receiver, G, suspended by means of straps H, to receive the tombstones, and in which they can be easily and permanently adjusted.

The nuts F are locked by means of wedge-shaped keys *a a*, driven downward in holes formed one half in the bolt and the other half in the nut, as shown in Fig. 3.

This apparatus may be made of either iron or steel, and the continuous bottom and upright protecting-rods B should be placed from four to eight inches apart, but should be sufficiently close together to prevent the use of any kind of an implement between them by which the body could be disturbed.

From the very nature of the construction, as described, it will be understood that the cage is made much larger than the coffin; and after the body has been deposited in the cage and let down in the grave, the earth, in filling up the grave, will readily pass through the interstices of the cage and completely fill the same around the coffin. The earth may then be rammed or packed in with suitable instruments through the openings between the bars.

By this means the cage is so heavily weighted that it cannot be lifted out of the grave by ordinary means or manual efforts, nor can the earth be removed to lighten it.

The cage not only protects the remains, so that they can at any time be easily found and gathered together for the purpose of removal and reburial, but it also may serve as a lasting mark of the final resting-place of the body, and the grave can be beautified to any degree desired by setting out or planting flowers in the spaces between the finishing top strips, D.

The nuts cannot be wrenched off without bursting them, the wedges *a a* being driven in perfectly tight after the nuts are to their places. There is no room at any point to drive out or in any way loosen these wedges or to cut them with a chisel.

Having thus fully described my invention, what I claim as new, and desire to secure by Letters Patent, is—

1. A cage or burial safe for protecting coffins containing dead bodies, composed of metal with perforations or interstices, and a cover of similar construction, adapted to be firmly fastened in place, said cage being of a size much larger than the coffin, whereby, when the latter is deposited within it and the whole lowered into the grave, the cage may be filled with earth through its openings for the purpose of weighting it, so that it cannot be removed by body-stealers, substantially as described.

2. The cage or burial safe, of larger size than the coffin it is to receive, and composed of iron or steel bars or rods secured together so as to leave interstices between the bars or rods, substantially for the purposes herein set forth.

3. The combination of the bed A, protecting-rods B, top plates, C, strips D, and nuts F, substantially as and for the purposes herein set forth.

In testimony that I claim the foregoing I have hereunto set my hand this 1st day of February, 1879.

SOLOMON S. SMICK.

Witnesses:
HENRY COLERICK,
C. M. COMPANT.